United States Patent [19]
Green et al.

[11] Patent Number: 5,794,982
[45] Date of Patent: Aug. 18, 1998

[54] MECHANICAL PIPE JOINT WITH LINERS

[76] Inventors: Herbert J. Green, P.O. Box 6639, Kingwood, Tex. 77325; Major G. Butler, Rte. 1, Box 356, Huntsville, Tex. 77340; Shafagat Fahrazovich Tahautdinov, Beloglazov Street, 11-a, 423400 Almetyevsk, Tatarstan, Russian Federation; Ampir Shaibakovich Syrtlanov, Sultanov Street, 24-26, 450000 Ufa, Bashkortostan, Russian Federation; Magsum Mudarisovich Zagirov, Golog Street, 66-56, 423200 Bugulma, Tartarstan, Russian Federation; Ivan Fedorovich Kalachev, Alisha Street, 14-69, 423200 Bugulma, Tatarstan, Russian Federation; Alexander Leongardovich Voider, Tukhachevsky Street, 10-125, 423200 Bugulma, Tatarstan, Russian Federation

[21] Appl. No.: 554,197

[22] Filed: Nov. 6, 1995

[51] Int. Cl.$^6$ .................................. F16L 9/14
[52] U.S. Cl. .................. 285/55; 285/258; 285/369; 285/915; 29/234
[58] Field of Search .................. 285/55, 258, 369, 285/915

[56] References Cited

U.S. PATENT DOCUMENTS

| | | | |
|---|---|---|---|
| 417,688 | 12/1889 | Tatham | 285/55 X |
| 1,890,007 | 12/1932 | Talbot | 285/55 |
| 3,210,095 | 10/1965 | Elliott | 285/55 |
| 3,508,766 | 4/1970 | Kessler et al. | 285/21 |
| 3,722,925 | 3/1973 | Robbins | 285/55 |
| 3,836,334 | 9/1974 | Karamian | 23/259 |
| 4,277,091 | 7/1981 | Hunter | 285/55 |
| 4,445,716 | 5/1984 | Hoffman | 285/55 |
| 5,199,153 | 4/1993 | Schulte-Ladbeck | 29/447 |
| 5,244,237 | 9/1993 | Harvey | 285/55 |
| 5,348,211 | 9/1994 | White et al. | 285/55 X |
| 5,644,832 | 7/1997 | Kanao | 285/369 X |

*Primary Examiner*—Randolph A. Reese
*Assistant Examiner*—Greg Binda

[57] ABSTRACT

Methods for installing liners in metal pipes incorporating the embodiments of this invention are disclosed. Liner (30), pulled through the pipe, is cut back to the correct position in socket (22) and pin (36). Socket clamp (32) or pin clamp (42) is placed over extrusion rod (78) of reverse calibration machine (60). Liner clamp mandrel (76) is installed behind the clamp. First hydraulic cylinder (64) and second hydraulic cylinder (66) in reverse calibrator frame (62) are activated to move extrusion rod (78). The tapered surface of liner clamp mandrel (76) comes in contact with the clamp, expanding the clamp walls as the hard tool steel of the mandrel contacts the softer steel of the clamp. Liner clamp mandrel (76) passes fully through the clamp completing the installation. Liner (30) is locked between socket clamp (32) or pin clamp (42) and the inside wall of the calibrated section of socket (22) or pin (36). The inside wall of socket clamp (32) or pin clamp (42) is positioned to create a continuous and substantially flush surface with the inside wall of liner (30) extending along the inside wall of the pipe outside of the area occupied by socket (22) or pin (36). This alignment of the preferred embodiment of socket (22) and pin (36) is one of the key features of this invention. Although the method of forming a mechanical pipe joint is not an embodiment herein, the preparation of pipe ends with inserted liners for joining by mechanical means is an important embodiment of this invention. The preferred embodiment of pin (36) is shown fully inserted into the preferred embodiment of socket (22). All inside surfaces are positioned to create a continuous and substantially flush surface where the inside wall of socket clamp (32) and pin clamp (42) are flush and do not protrude below the inside wall of liner (30) extending along the inside wall of the pipe, outside of the area occupied by the socket and pin. The alignment of the pin (36) and socket (22) following assembly of the mechanical pipe joint is a key functional benefit provided by the preferred embodiments of this invention.

6 Claims, 5 Drawing Sheets

MECHANICAL PIPE JOINT WITH LINERS

BACKGROUND

1. Field of Invention

This invention relates to a method for aligning and securing a liner inside tubular members that are subsequently utilized in the construction of a pipeline by means of mechanical pipe joints.

2. Discussion of Prior Art

There are many requirements in the oil and gas industry for the transport of fluids that are corrosive to the material, usually steel, used to manufacture the tubular members, referred to herein as pipe. To avoid or delay corrosion damage to the pipe, it is common to cover the complete inside length of the pipe with a corrosive resistant coating or liner, prior to the joining together of the individual lengths of pipe. The discussion herein is focused on the application of liners for this purpose.

A liner is a tubular member designed for insertion inside a second tubular member, in this instance a steel pipe. Materials commonly used for the liner include polyethylene, epoxies, thermoplastic materials or other similar materials with adequate tensile strength. Although these liners provide a good protective coating throughout the length of the pipe section, the weakness of the technology has been in the area of the pipe joint. The prevailing deficiency in the prior art is lack of a method to provide a continuous protective lining throughout a fluid and gas tight joint, particularly when the transported fluids and gases are at very high pressures. An additional deficiency has been the lack of a good method to effectively secure a liner inside a pipe section operating in these conditions. Although many techniques have been utilized, a totally satisfactory and cost effective solution has not been previously developed to address either of these deficiencies.

The predominant method of securing liners inside pipe sections has been to utilize fixing rings or clamps inside the pipes. Due to the space occupied by these fixing rings or clamps, the cross-section or internal diameter becomes smaller in this area. This reduction in diameter results in increased hydraulic resistance in the pipeline in these restricted areas. This condition has the potential of triggering a number of physical-chemical processes that can lead to the exposure of the pipe inner wall and resulting corrosion and pipeline failure.

Currently, welding remains the predominate method of joining pipe with inserted liners in medium to high pressure applications. The primary disadvantage of welding such pipes results from the heat generated in the welding process. This heat melts or burns away the liner in the area of the joint, thus destroying the effectiveness of the liner in preventing exposure of the base metal to the corrosive elements. In an attempt to control the influence of this generated heat various types of heat shields or heat retardant metal protectors are inserted in the pipe ends and the liners are cut back away from the joint area. Unfortunately, this heat effected zone is quite large, requiring a large and correspondingly expensive protector, manufactured from expensive heat retardant materials, on each of the two pipe ends to be joined. Furthermore, the insertion of these protectors creates a restriction of the inside diameter which has the same negative effect as noted above for fixing rings and clamps used to secure liners to the pipe. Welding techniques have been developed which are both expensive and time consuming, in an attempt to reduce the temperature buildup in the joint area. A predominate approach is to make a series of weld passes with a cooling period between each pass. This results in significant delays which tie up expensive resources for long periods of time.

These and other similar embodiments of pipes with liners and pipe joints formed from lined pipes have some or all of the limitations mentioned above. All of these limitations in the prior art are resolved by our invention.

OBJECTS AND ADVANTAGES

Accordingly, several objects and advantages of our invention are:

(a) to eliminate the restricted cross-section or internal diameter in the space occupied by fixing rings or clamps used to secure internal liners to the inside of the pipe wall, thus eliminating any increased hydraulic resistance in the pipeline in these areas;

(b) to provide a method for clamping a liner to the pipe wall without creating internal diameter restrictions;

(c) to provide an improved and inexpensive clamp;

(d) to eliminate the need for long and correspondingly expensive protectors manufactured from expensive heat retardant materials on each of the two pipe ends to be joined;

(e) to eliminate the restriction of the inside diameter in the space occupied by protectors, thus eliminating any increased hydraulic resistance in the pipeline in these areas;

(f) to eliminate welding as the method of joining pipe with inserted liners, thus eliminating the negative impact of a heat effected zone created during the welding process and eliminating the expensive and time consuming techniques developed to control heat buildup during the welding of weld pipe joins with liners; and (g) to broaden the scope of pipe applications utilizing internal liners by providing improved methods and embodiments that eliminate current restrictive features.

These and other objects, advantages, and features of our invention will be apparent to those skilled in the art from a consideration of this specification, including the attached drawings and appended claims.

DRAWING FIGURES

The below listed drawing figures are utilized in the narrative description of the structure of our invention and in the explanation of operations.

Reference Numerals In Drawings

| 20 | first pipe section | 22 | socket |
| 24 | socket bell section | 26 | socket flare section |
| 28 | socket calibrated section | 30 | liner |
| 32 | socket clamp | 34 | second pipe section |
| 36 | pin | 38 | pin calibrated section |
| 40 | pin tapered section | 42 | pin clamp |
| 44 | socket clamp riser | 46 | socket clamp cavity |
| 48 | pin clamp riser | 50 | pin clamp cavity |
| 52 | sealant | 54 | tapered annural cavity |
| 56 | internal annural bead | 58 | external annular bead |
| 60 | reverse calibration machine | 62 | reverse calibrator frame |
| 64 | first hydraulic cylinder | 66 | second hydraulic cylinder |
| 68 | first cylinder rod | 70 | second cylinder rod |
| 72 | pipe end stop | 74 | pipe socket stop |
| 76 | liner clamp mandrel | 78 | extrusion rod |
| 80 | extrusion rod slot | 82 | mandrel pin |
| 84 | socket flange | 86 | third pipe section |
| 88 | fourth pipe section | | |

DESCRIPTION—FIGS. 1 TO 10

Figure 1:
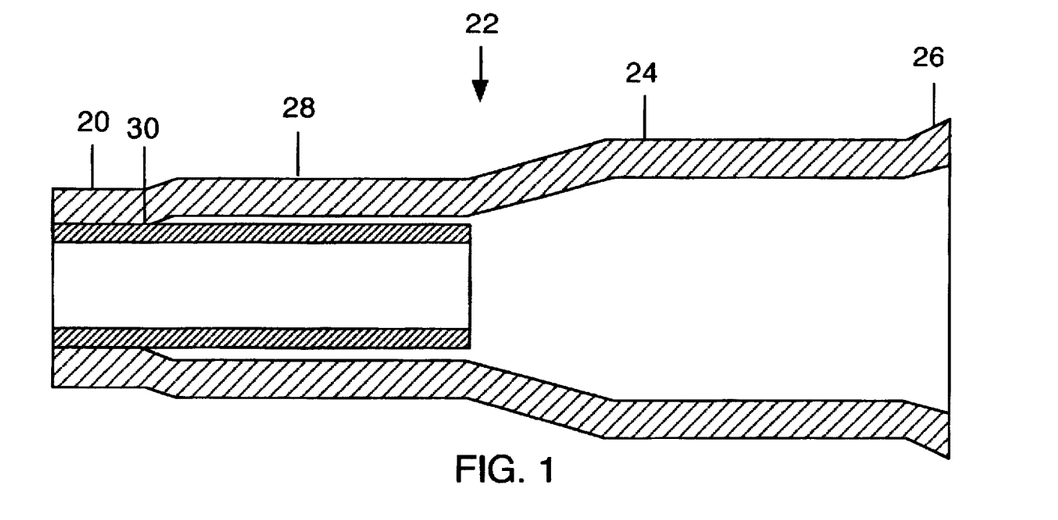
FIG. 1 is a cross sectional view of a pipe end with a preformed socket, containing a liner which is cut back to the appropriate depth inside the socket.

In FIG. 1, a first pipe section 20 is shown with a socket 22 preformed on the end of the pipe utilizing a hydraulic means (not shown) in a previous operation. Socket 22 contains a socket bell section 24, a socket flare section 26 with an outwardly extending taper and a socket calibrated section 28. Socket calibrated section 28 of socket 22 connects the socket to the remainder of first pipe section 20. A liner 30 extends through the length of the pipe ending on the socket end at a designated position in socket 22. The liner is manufactured from polyethylene based raw materials utilizing a extrusion means (not shown) in a previous operation.

Figure 2:
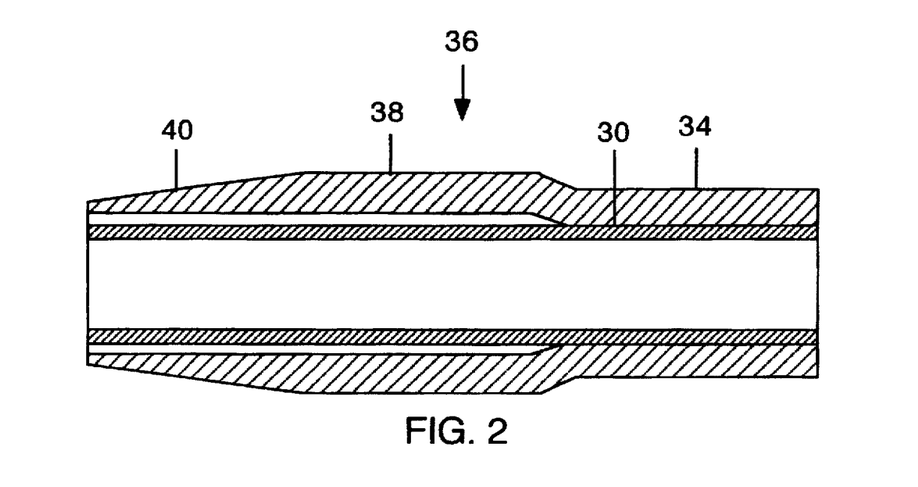
FIG. 2 is a cross sectional view of a pipe end with a preformed pin end, containing a liner which extends to the end of the pin.

In FIG. 2, a second pipe section 34 is shown with a pin 36 preformed on the end of the pipe utilizing a machining and/or a hydraulic means (not shown) in a previous operation. Pin 36 contains a pin calibrated section 38 and a pin tapered section 40. Pin tapered section 40 has an inwardly extending taper on its outside surface. Pin calibrated section 38, shown in FIG. 2, has an inside diameter equal to socket calibrated section 28, an outside diameter greater than the inside diameter of socket bell section 24 but less than the inside diameter of socket flare section 26. These three parts are shown in FIG. 1. Pin calibrated section 38 connects the pin to the remainder of second pipe section 34. Liner 30 extends through the length of the pipe, ending on the pin end at a designated position at the end of pin 36.

Figure 3A:
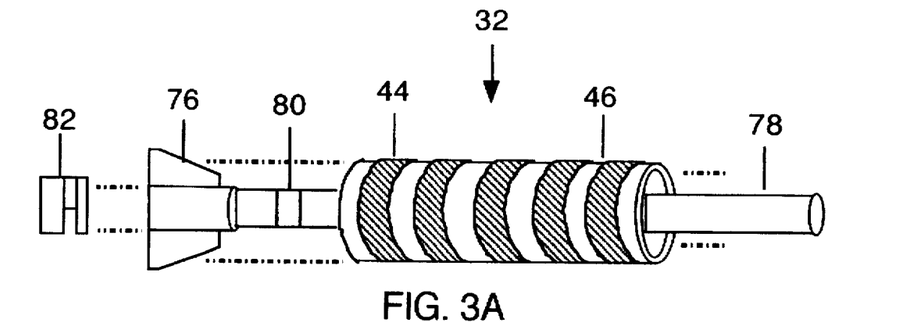
FIG. 3A is a side view showing the placement of a socket clamp and mandrel on the extrusion rod in preparation for installation of the socket clamp inside the pipe.

In FIG. 3A, a socket clamp 32 is shown as it is placed over a extrusion rod 78. The surface of socket clamp 32 contains a socket clamp riser 44 and a socket clamp cavity 46. These surface areas are formed using a machining means (not shown) applied in a previous operation. Socket clamp riser 44 has a roughly finished level surface area approximately 15 mm wide. The riser extends above socket clamp cavity 46 by approximately 2 mm and is parallel to its level surface.

The width of socket clamp cavity 46 which has a smooth surface finish is also approximately 15 mm. Socket clamp 32 is manufactured from steel pipe with elongation characteristics adequate for the required expansion of the clamp, normally in the range of 3% to 6%. Russian pipe grade 10 or grade 20, or API grade B or grade X-42, or the equivalent has been successfully utilized. The total length of socket clamp 32 is dependent solely on the force required to hold a liner of a particular diameter, length and wall thickness in position without movement. The material selection, thickness and overall length of the clamp is made giving no consideration to welding or related heat effected zones as welding is not utilized in the joining of the prepared pipe ends. A liner clamp mandrel 76 is installed on extrusion rod 78 behind socket clamp 32. The mandrel is manufactured from AISI A2 tool steel, however AISI M4 tool steel is substituted if severe wear conditions are encountered. A mandrel pin 82 manufactured from AISA 4140 or 4150 material is placed in a extrusion rod slot 80 to secure the mandrel on the rod.

Figure 3B:
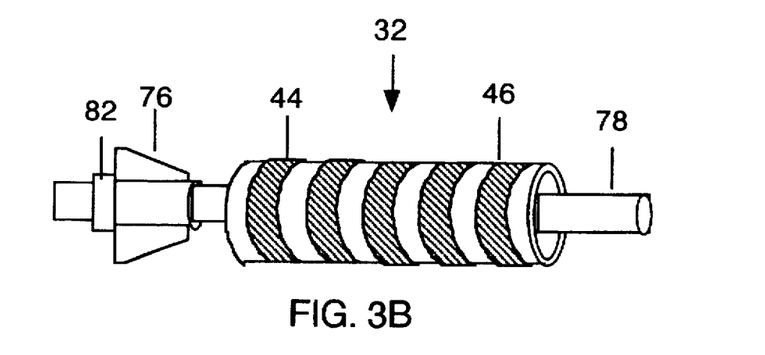
FIG. 3B is a side view showing the position of the socket clamp and mandrel on the extrusion rod immediately prior to installation of the socket clamp inside the pipe.

In FIG. 3B, the completed mounting of socket clamp 32 and liner clamp mandrel 76 is shown. Mandrel pin 82 is shown installed behind the mandrel. No parts are introduced in this figure.

Figure 4:
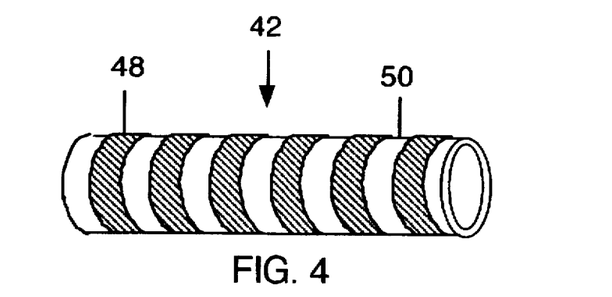
FIG. 4 is a side view of the pin clamp.

In FIG. 4, a pin clamp 42 is shown. The surface of pin clamp 42 contains a pin clamp riser 48 and a pin clamp cavity 50. Pin clamp riser 48 has a roughly finished level surface area approximately 15 mm wide. The riser extends above pin clamp cavity 50 by approximately 2 mm and is parallel to its level surface . The width of pin clamp cavity 50 which has a smooth surface finish is also approximately 15 mm. Pin clamp 42 is manufactured from a steel pipe with elongation characteristics adequate for the required expansion of the clamp, normally in the range of 3% to 6%. Russian pipe grade 10 or grade 20, or API grade B or grade X-42, or the equivalent has been successfully utilized. The total length of pin clamp 42 must be long enough to hold a liner of a particular diameter, length and wall thickness in position without movement but cannot be shorter than the length requirement of the pin end of a mechanical pipe joint. The material selection, thickness and overall length of the clamp is made giving no consideration to welding or related heat effected zones as welding is not utilized in the joining of the prepared pipe ends.

Figure 5:
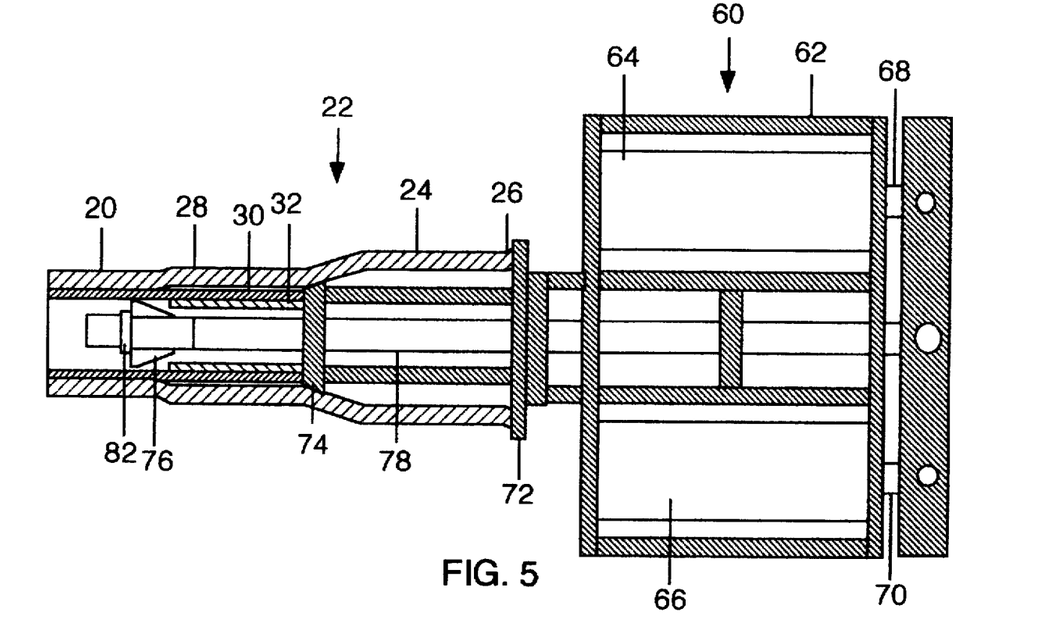
FIG. 5 is a cross sectional view showing the socket end of a pipe positioned on the reverse calibration machine for installation of the socket clamp inside the pipe.

In FIG. 5, a reverse calibration machine 60 is shown. This machine is used to elongate socket clamp 32 to secure liner 30 against socket calibrated section 28 of socket 22. A reverse calibrator frame 62 of reverse calibration machine 60 secures a first hydraulic cylinder 64 containing a first cylinder rod 68 and a second hydraulic cylinder 66 containing a second cylinder rod 70. Reverse calibration frame 62 is manufactured from ASTM A-36 material or the equivalent. The cylinders and rods are standard heavy duty industrial cylinders specifically sized to provide the necessary force to perform the clamping operation. Socket 22 is secured against a pipe end stop 72 and a pipe socket stop 74. Both pipe stops are manufactured from ASTM A-36 plate or the equivalent. Liner clamp mandrel 76 and mandrel pin 82 mounted on extrusion rod 78 is position behind socket clamp 32 as shown in FIG. 3B.

Figure 6:
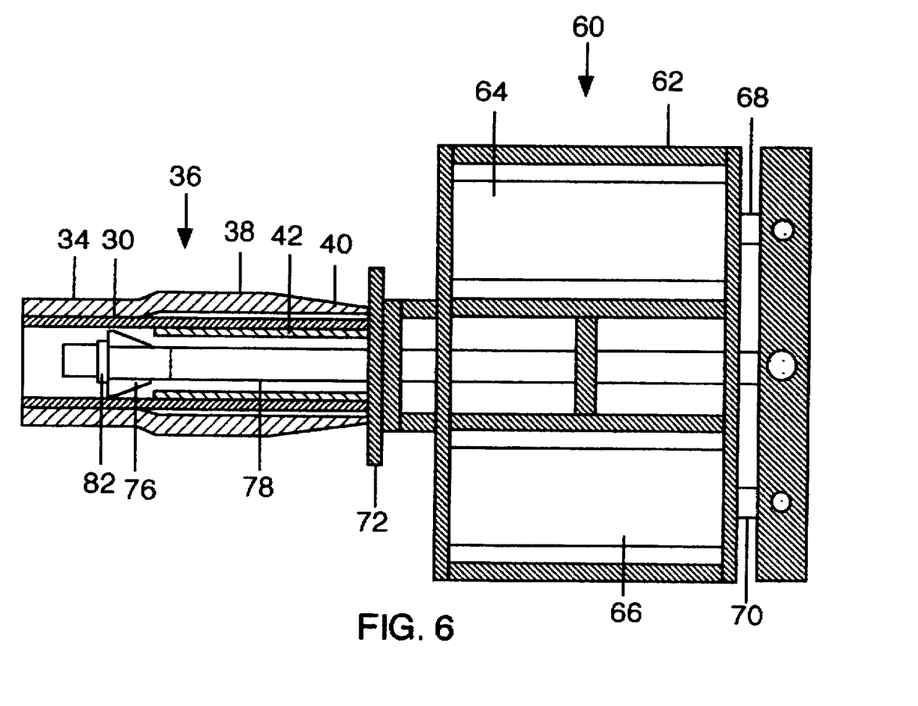
FIG. 6 is a cross sectional view showing the pin end of a pipe positioned on the reverse calibration machine for installation of the pin clamp inside the pipe.

In FIG. 6, reverse calibration machine 60 is again shown. Pipe socket stop 74, shown in FIG. 5, is removed and pin 36 is secured against pipe end stop 72. Liner clamp mandrel 76 and mandrel pin 82 mounted on extrusion rod 78 is position behind pin clamp 42. No parts are introduced in this figure.

Figure 7:
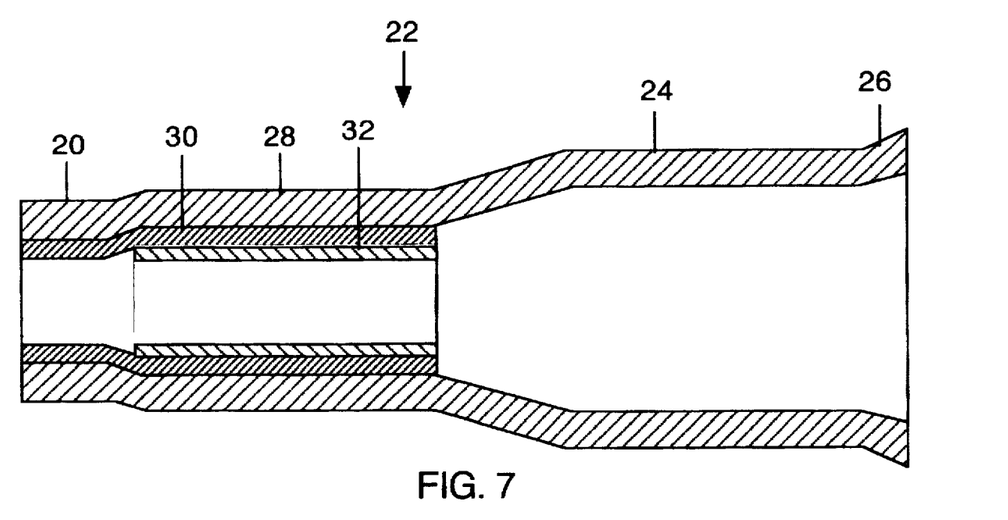
FIG. 7 is a cross sectional view of the preferred embodiment of the socket with clamped liner.

In FIG. 7, the preferred embodiment of socket 22 is shown with socket clamp 32 in the elongated or clamped position.

Liner 30 is locked between socket clamp 32 and the inside wall of socket calibrated section 28 of socket 22. The positional relationship between the inside wall of liner 30 extending along first pipe section 20 and the inside wall of socket clamp 32 is shown. These inside surfaces are positioned to create a continuous flush surface where the inside wall of socket clamp 32 does not protrude below or inside the surface of liner 30 as it extends along the inside wall of first pipe section 20. The alignment of the preferred embodiment of socket 22 is one of the key features of this invention. The length of socket calibrated section 28 is determined strictly by the length requirement of socket clamp 32. No parts are introduced in this figure.

Figure 8:
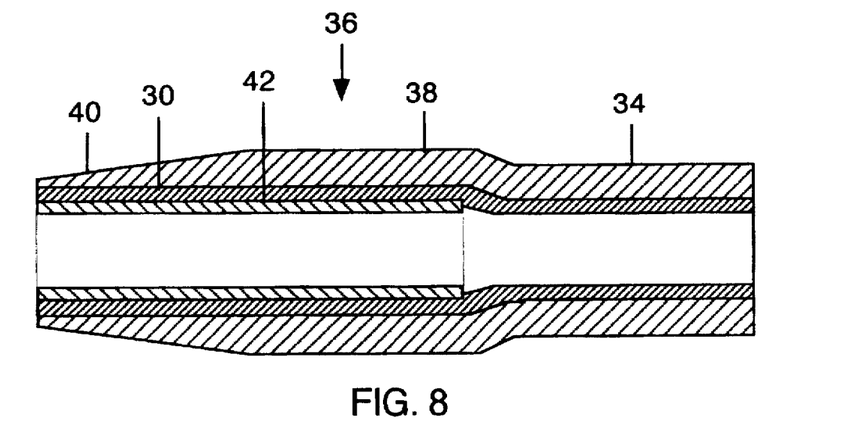
FIG. 8 is a cross sectional view of the preferred embodiment of the pin with clamped liner.

In FIG. 8, the preferred embodiment of pin 36 is shown with pin clamp 42 in an elongated or clamped position. Liner 30 is locked between pin clamp 42 and the inside wall of pin calibrated section 38 and pin tapered section 40 of pin 36. The positional relationship between the inside wall of liner 30 extending along second pipe section 34 and the inside wall of pin clam p 42 is shown. These inside surfaces are positioned to create a continuous flush surface where the inside wall of pin clamp 42 does not protrude below or inside the surface of liner 30 as it extends along the inside wall of second pipe section 34. The alignment of the preferred embodiment of pin 36 is one of the key features of this invention. The combined length of pin calibrated section 38 and pin tapered section 40 is long enough to contain the full length of pin clamp 42, but is not shorter than the length required for the pin end of a mechanical pipe joint.

Figure 9A:
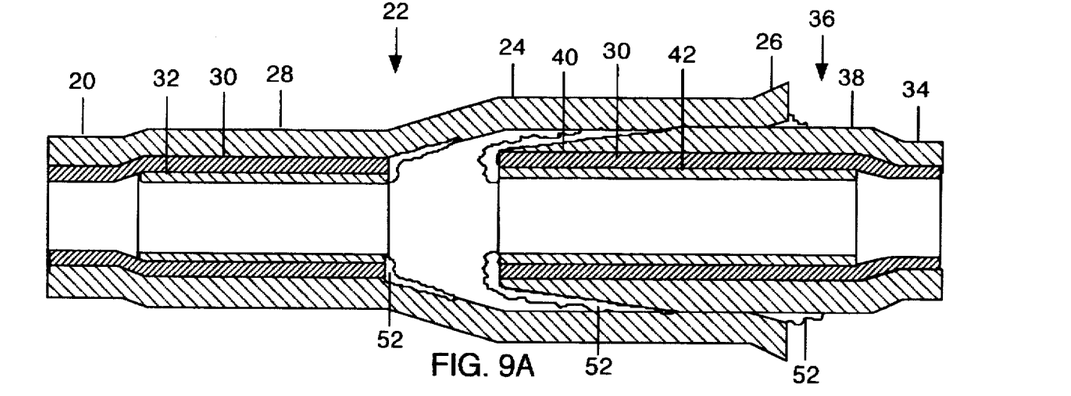
FIG. 9A is a cross sectional view of the preferred embodiment of the socket and pin of this invention during assembly of the socket and pin to form a mechanical pipe joint.

In FIG. 9A, second pipe section 34 is shown during the joining process with first pipe section 20. Pin 36 is shown partially inserted into socket 22. A sealant 52 is applied to the exposed front edges of liner 30 and socket clamp 32, extending along the surface of socket 22 for a length of approximately 40 mm. The thickness of the application is approximately 3 mm. Sealant 52 is applied to the exposed front edges of liner 30 and pin clamp 42, extending along the surface of pin 36 for a length of approximately 40 mm. The thickness of the application is approximately 3 mm. A small portion of sealant 52 is shown on the outside wall of pin calibrated section 38 of pin 36. This is the portion of the sealant pressed out of the joint during assembly.

Figure 9B:
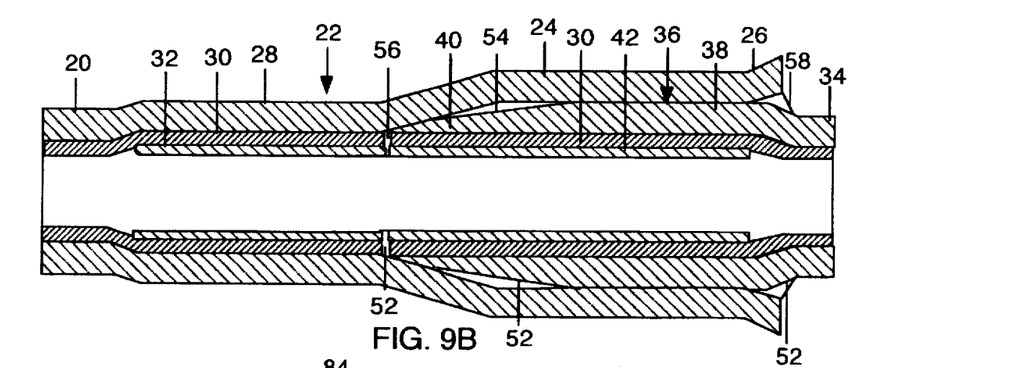
FIG. 9B is a cross sectional view of the preferred embodiment of the socket and pin of this invention fully assembled into a mechanical pipe joint.

In FIG. 9B, second pipe section 34 is shown fully joined with first pipe section 20. The preferred embodiment of pin 36 is shown fully inserted into the preferred embodiment of socket 22. The positional relationship in an assembled pipe joint between the inside wall of liner 30 of first pipe section 20 and second pipe section 34 and the inside wall of socket clamp 32 and pin clamp 42 is shown. All of these inside surfaces are positioned to create a continuous flush surface where the inside wall of socket clamp 32 and pin clamp 42 do not protrude below or inside the parallel plane of liner 30 as it extends along the inside wall of first pipe section 20 and second pipe section 34, outside of the area occupied by the clamps. The alignment of the preferred embodiment of pin 36 and the preferred embodiment of socket 22 following assembly into a mechanical pipe joint demonstrates the functional utility of these preferred embodiments. Sealant 52 is trapped in a tapered annural cavity 54 and a internal annural bead 56. A portion of sealant 52 forms a external annular bead 58.

Figure 10:
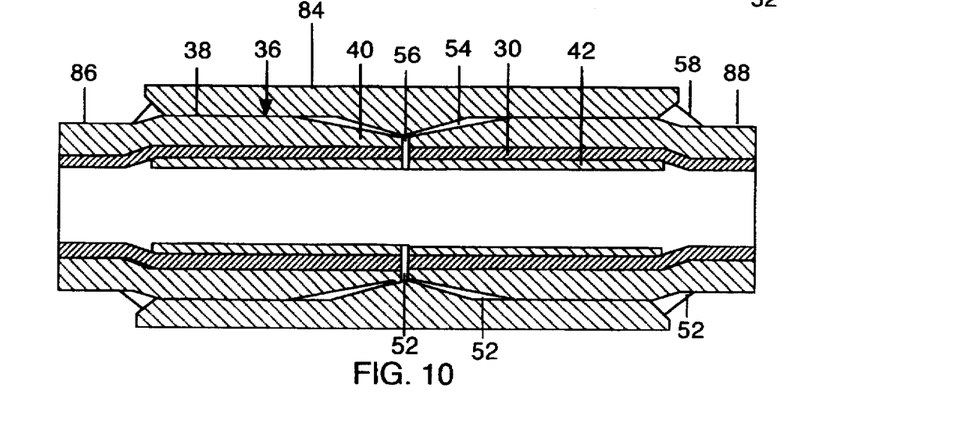
FIG. 10 is a cross sectional view of an alternate assembly using the preferred embodiment of the pin of this invention.

In FIG. 10, an alternate application for the preferred embodiment of pin 36 is shown. A socket flange 84 is utilized to form the socket area of the mechanical pipe joint of FIG. 10. A third pipe section 86 and a fourth pipe section 88, each with pin 36 preformed on the pipe ends is shown fully assembled into socket flange 84. The two pin 36 assemblies are identical. The alignment principles outlined in the FIG. 9B description above for liner 30 in relationship to pin clamp 42 are maintained in this alternate embodiment for the application of the preferred embodiment of pin 36.

Operation—FIGS. 1 to 10

Liner 30 is pulled through the full length of the pipe utilizing a winching means (not shown) in a previous operation. On the socket end, liner 30 is cut back to the exact outside edge of socket calibrated section 28 of socket 22 utilizing a circular cutting means with a depth gauge (not shown) in a previous operation. The resulting alignment of liner and socket are shown in FIG. 1. On the pin end, liner 30 is cut back to the exact outside edge of pin tapered section 40 of pin 36 utilizing a circular cutting means (not shown) in a previous operation. The resulting alignment of liner and pin are shown in FIG. 2. The liner is now ready for the clamping process.

As shown in FIG. 3A, socket clamp 32 is placed over extrusion rod 78. Liner clamp mandrel 76 is installed behind socket clamp 32 and mandrel pin 82 is placed in extrusion rod slot 80 to secure the mandrel on the rod. The completed assembly is shown in FIG. 3B.

First pipe section 20, with liner 30 correctly positioned in socket 22, is moved into position on reverse calibration machine 60 as shown in FIG. 5. Socket flare section 26 of socket 22 contacts pipe end stop 72 and the inside edge of socket bell section 24 contacts pipe socket stop 74. These contact points prohibit forward movement of the pipe during installation of socket clamp 32. First hydraulic cylinder 64 and second hydraulic cylinder 66 enclosed in reverse calibrator frame 62 are activated from a hydraulic power and control source (not shown). First cylinder rod 68 and second cylinder rod 70 move outward from the cylinders, under hydraulic pressure, forcing the movement of extrusion rod 78. This movement places the tapered surface of liner clamp mandrel 76 in contact with socket clamp 32. As liner clamp mandrel 76 continues its movement, the walls of socket clamp 32 are expanded as the hard tool steel of the mandrel contacts the softer steel of the clamp. Mandrel pin 82 secures the mandrel in place during the elongation of the clamp. After liner clamp mandrel 76 passes fully through socket clamp 32, the installation of the clamp is complete and liner 30 is properly secured against the inside wall of socket calibrated section 28 of socket 22. The product of the completed operation, shown in FIG. 7, represents the preferred embodiment of socket 22 of this invention.

Pin clamp 42, shown in FIG. 4, is placed over extrusion rod 78 of reverse calibration machine 60. Liner clamp mandrel 76 is installed behind pin clamp 42 and mandrel pin 82 is placed in extrusion rod slot 80 to secure the mandrel on the rod. This manner of assembly is the same as is shown for mounting socket clamp 32 in FIG. 3A.

Second pipe section 34, with liner 30 correctly positioned in pin 36, is moved into position on reverse calibration machine 60 as shown in FIG. 6. The end of pin tapered section 40 of pin 36 contacts pipe end stop 72. This contact point prohibit forward movement of the pipe during installation of pin clamp 42. First hydraulic cylinder 64 and second hydraulic cylinder 66 enclosed in reverse calibrator frame 62 are activated from a hydraulic power and control source (not shown). First cylinder rod 68 and second cylinder rod 70 move outward from the cylinders, under hydraulic pressure, forcing the movement of extrusion rod 78. This movement places the edges of liner clamp mandrel 76 in contact with pin clamp 42. As liner clamp mandrel 76 continues its movement, the walls of pin clamp 42 are expanded as the hard tool steel of the mandrel contacts the soft steel of the clamp. Mandrel pin 82 secures the mandrel in place during the elongation of the clamp. After liner clamp mandrel 76 passes fully through pin clamp 42, the installation of the clamp is complete and liner 30 is properly secured against the inside wall of pin calibrated section 38 and pin tapered section 40 of pin 36. The product of the completed operation, shown in FIG. 8, represents the preferred embodiment of pin 36 of this invention.

In the prior art, the spaces occupied by liner clamps result in a cross-section or internal diameter which is smaller and thus restricted in this area. This reduction in diameter results in increased hydraulic resistance, which has the potential of triggering a number of physical-chemical processes, that can lead to the exposure of the pipe inner wall, thus resulting in corrosion and pipeline failure. One of the key ramifications of this invention is the elimination of this condition.

The capability of socket clamp 32 and pin clamp 42 to hold the liner in place against the inside wall of the pipe is insured by the following attributes. First, the length of the clamp is determined by analysis of the variables that determine necessary holding strength. These variables include the diameter of the pipe and liner, the material specifications of the liner and clamp and the temperature ranges of the fluids and gases transported. Second, the surface configuration of socket clamp 32, shown in FIG. 3B, consisting of socket clamp riser 44 and socket clamp cavity 46, and pin clamp 42, shown in FIG. 4, consisting of pin clamp riser 48 and pin clamp cavity 50, provides a solid gripping action on the liner. Thirdly, liner 30 behaves as a firm substance during elongation of socket clamp 32 and pin clamp 42 resulting in an elongation of the outer pipe wall. After pressure is relieved the outer pipe wall will compress or spring back slightly causing the liner to fill any voids in places of contact. This compression increases the coefficient of friction which results in better contact between the liner, metal pipe and clamp. Accordingly, this combination of lining and clamping techniques provides a pipeline with a constant cross section and a liner tightly fixed to the metal pipe.

Although the technique of forming a mechanical pipe joint is not an embodiment herein, the preparation of pipe ends with inserted liners for joining by mechanical means is an important embodiment of this invention. Therefore, it must be shown that the preferred embodiments of this invention may be successfully utilized to form a mechanical pipe joint. When assembly is completed, as shown in FIG. 9B, the inside surface of socket clamp 32 and pin clamp 42 are flush and do not protrude below or inside surface of liner 30 as it extends along the inside wall of the pipe. The alignment of pin 36 and socket 22 following assembly of the mechanical pipe joint is a key functional benefit provided by the preferred embodiments of this invention.

In the prior art, welding remains the primary method of joining pipe with inserted liners. Without the use of heat shields or heat retardant metal protectors, heat generated by the welding process burns away the liner in the joint area, thus destroying the effectiveness of the liner in preventing exposure of the base metal to corrosive elements. The utilization of such materials is both expensive and time consuming and the internal diameter restriction created by these materials has the same negative effect as previously noted for liner clamps in the prior art. A key ramification of this invention is the opportunity to eliminate heat shields and heat retardant metal protectors and the related disadvantages. The following operations description referencing FIG. 9A, FIG. 9B, and FIG. 10, confirms that the preferred embodiments of this invention may be successfully utilized to form a mechanical pipe joint.

The manner of joining together first pipe section 20 and second pipe section 34 to form a mechanical pipe joint is shown in FIG. 9A. Immediately prior to insertion, the outside surface of the preferred embodiment of pin 36 is coated with sealant 52 and then positioned on the inside lip of the preferred embodiment of socket 22, resting on the inside edge of socket flare section 26. Socket flare section 26 is formed to facilitate the stabbing of pin 36 into socket 22 and provides a surface area for positioning of pin 36 on the inside lip of socket 22 prior to insertion. Pin 36 is then forced into socket 22 until the insertion depth marked on the outside of the pipe (not shown) is reached. A hydraulic means (not shown) is utilized to perform the insertion.

Socket bell section 24 of socket 22 has an inside diameter slightly less than the outside diameter of pin calibrated section 38 of pin 36, approximately 0.75 mm to 1.2 mm. Accordingly, when pin 36 is inserted into socket 22, there will be an interference fit between the outside surface of pin calibrated section 38 and the inside surface of socket bell section 24. This interference fit provides the mechanical strength of the joint, that is, its ability to withstand tensile and bending forces.

As noted in the description of FIG. 9A, sealant 52 is applied to the exposed front edges of liner 30 and socket clamp 32 and along the surface of socket 22. Sealant 52 is also applied to the exposed front edges of liner 30 and pin clamp 42 and along the surface of pin tapered section 40 of pin 36. Sealant 52 is extruded longitudinally from between the tapered sections of the pin and socket during the assembly process.

Following completion of mechanical joint assembly, tapered annular cavity 54 and internal annural bead 56 are filled with sealant 52 as shown in FIG. 9B. The inside tip of internal annular bead 56 formed around the inside surface of the mechanical joint is exposed to the fluids or gases flowing in the pipe, however, the anti-corrosive properties of sealant 52, properly selected, exceed those of liner 30. Sealant 52, trapped in tapered annular cavity 54, provides a seal between the two surfaces of socket 22 and pin 36, thus preventing fluids or gases from leaking through the mechanical joint. A small portion of sealant 52, trapped between socket flare section 26 and the outside exposed wall of second pipe section 34, forms external annular bead 58. Many alternative substances that are soft enough to apply and which will later harden can serve as a sealant, however, selection of a specific sealant is subject to ambient temperatures encountered during construction and the corrosive properties of the fluids or gases to be transported. Preferably, synthetic polymers including highly reactive acrylated polymeric adhesives are utilized. These substances are semi-solid before application and become elastomeric even when exposed to extreme variations in ambient temperatures, retaining their anti-corrosive properties.

FIG. 10, shows an alternate embodiment for the application of pin 36 in a mechanical pipe joint. Socket flange 84 forms the socket of the mechanical pipe joint. Third pipe section 86 and fourth pipe section 88, each with pin 36 preformed on the pipe ends are assembled into socket flange 84 using a hydraulic means (not shown). Each pin 36 is identical. Immediately prior to insertion, the outside surface of each pin 36 is coated with sealant 52 and then positioned on the inside lip of socket flange 84. Pin 36 is then forced into socket flange 84 until the insertion depth marked on the outside of each pipe (not shown) is reached.

The inside wall of socket flange 84 has an inside diameter slightly less than the outside diameter of pin calibrated section 38 of pin 36, approximately 0.75 mm to 1.2 mm.

Accordingly, when pin 36 is inserted into socket flange 84, there will be an interference fit between the outside surface of pin calibrated section 38 and the inside surface of socket flange 84. This interference fit provides the mechanical strength of this mechanical pipe joint, that is, its ability to withstand tensile and bending forces.

Following completion of mechanical joint assembly, tapered annular cavity 54 and internal annural bead 56 are filled with sealant 52 as shown in FIG. 10. The inside tip of internal annular bead 56 formed around the inside surface of the mechanical joint is exposed to the fluids or gases flowing in the pipe, however, the anti-corrosive properties of sealant 52, properly selected, exceed those of liner 30. Sealant 52, trapped in tapered annular cavity 54, provides a seal between the surfaces of socket 22 and pin 36, thus preventing fluids or gases from leaking through the mechanical joint. A small portion of sealant 52, trapped between socket flange 84 and the outside exposed wall of the pipe sections, forms external annular bead 58. The considerations for the selection of a solvent for the flanged mechanical pipe joint are identical to those outlined in the operations description above for the mechanical pipe joint of FIG. 9B.

SUMMARY, RAMIFICATIONS, AND SCOPE

Accordingly, the reader will see that the pipe configurations, alignment of parts and clamping embodiments of this invention clearly advance the availability and scope of methodology for the application of pipe liners in industrial applications. The embodiments of this invention improve the reliability, usability and affordability of pipe liners, particularly in environments where corrosive conditions are encountered. The alignment design of pipe, liner, and clamp in combination, specifically for application and use in a mechanical pipe joint, is a significant technological advancement, creating a highly competitive and more cost effective alternative methodology to the current base of available methods.

From the foregoing it will be seen that this invention is one well adapted to attain all of the ends and objects hereinabove set forth, together with other advantages which are obvious and which are inherent in the embodiments described. It will be understood that certain features and subcombinations are of utility and may be employed without reference to other features and subcombinations. This is contemplated by and is within the scope of the claims. As many possible embodiments may be made of the invention without departing from the scope thereof, it is to be understood that all matter herein set forth or shown in the accompanying drawings is to be interpreted as illustrative and not in a limiting sense.

We claim:

1. A pipe with a pipe end prepared for assembly as a portion of a mechanical pipe joint, comprising:
   a. a socket on the end of said pipe, preformed by a hydraulic means,
   b. said socket including a socket flare section having an outwardly extending taper with an inside diameter greater than an outside diameter of a pin calibrated section of a pin on a second pipe, prepared for insertion into said socket,
   c. said socket including a socket bell section having an inside diameter less than said outside diameter of said pin calibrated section of said pin on said second pipe, to form an interference fit with said pin calibrated section of said pin on said second pipe when said pin is inserted into said socket,
   d. said socket including a socket calibrated section with an inside diameter greater than an inside diameter of said pipe and equal to an inside diameter of said pin calibrated section of said pin on said second pipe,
   e. a liner preformed by a extrusion means and pulled through said pipe utilizing a winching means with a end point inside said pipe on outside edge of said socket calibrated section,
   f. a clamp equal in length to said socket calibrated section of said pipe, elongated against an inside wall of said liner by a hydraulically driven expansion means, securing said liner to said socket calibrated section of said pipe and positioned inside said pipe with a start point and an end point exactly matching a start point and an end point of said socket calibrated section, and
   g. an inside wall of said clamp positioned to create a continuous and substantially flush surface with said inside wall of said liner as it extends along inside wall of said pipe outside of the area occupied by said socket.

2. The clamp of claim 1 wherein said clamp is comprised of:
   a. a tubular member of predetermined dimensions preformed from metal by a metalmaking means with elongation properties adequate for a required 3% to 6% expansion of said clamp by said hydraulically driven expansion means,
   b. a plurality of socket clamp risers of equal dimensions, said socket clamp risers having a roughly finished level surface area of a predetermined width, formed on an outside wall surface of said clamp by a machining means, and
   c. a plurality of socket clamp cavities of equal dimensions, said socket clamp cavities having a substantially smooth finished surface area of a predetermined width, substantially parallel to and extending a predetermined depth below said socket clamp risers, formed on said outside wall surface of said clamp by said machining means.

3. A pipe with a pipe end prepared for assembly as a portion of a mechanical pipe joint, comprising:
   a. a pin on the end of said pipe, preformed by a manufacturing means,
   b. said pin including a pin tapered section on end of said pin having an inwardly extending taper profiled by said manufacturing means, on outside surface of said pin tapered section of said pin,
   c. said pin including a pin calibrated section having an inside diameter greater than an inside diameter of said pipe and equal to an inside diameter of a socket calibrated section of a socket on a second pipe, and having an outside diameter greater than an inside diameter of a socket bell section of said socket on said second pipe, to form an interference fit with said socket bell section of said socket on said second pipe when said pin is inserted into said socket,
   d. a liner preformed by a extrusion means and pulled through said pipe utilizing a winching means with a end point inside said pipe at end of said pin tapered section of said pipe,
   e. a clamp equal in length to said pin calibrated section of said pipe, elongated against an inside wall of said liner by a hydraulically driven expansion means, securing said liner to said pin calibrated section of said pipe and positioned inside said pipe with a start point and an end point exactly matching a start point and an end point of said pin calibrated section, and f. an inside wall of said clamp positioned to create a continuous and substantially flush surface with said inside wall of said liner as it extends along inside wall of said pipe outside of the area occupied by said pin.

4. The clamp of claim 3 wherein said clamp is comprised of:

a. a tubular member of predetermined dimensions preformed from metal by a metalmaking means with elongation properties adequate for a required 3% to 6% expansion of said clamp by said hydraulically driven expansion means.

b. a plurality of pin clamp risers of equal dimensions, said pin clamp risers having a roughly finished level surface area of a predetermined width, formed on an outside wall surface of said clamp by a clamp machining means, and c. a plurality of pin clamp cavities of equal dimensions, said pin clamp cavities having a substantially smooth finished surface area of a predetermined depth, substantially parallel to and extending a predetermined depth below said pin clamp risers, formed on said outside wall surface of said clamp by said clamp machining means.

5. A first pipe section and a second pipe section each with a pipe end prepared for assembly as a portion of a mechanical pipe joint, comprising:

a. a pin on the end of said first pipe section and said second pipe section, preformed by a manufacturing means.

b. said pin including a pin tapered section on end of said pin having an inwardly extending taper profiled by said manufacturing means, on outside surface of said pin tapered section of said pin.

c. said pin including a pin calibrated section having an inside diameter greater than an inside diameter of said first pipe section and said second pipe section, and having an outside diameter greater than an inside diameter of a socket flange, to form an interference fit with said socket flange when said pin on said first pipe section and said pin on said second pipe section are inserted into opposite ends of said socket flange.

d. a liner preformed by a extrusion means and pulled through said first pipe section and said second pipe section with a end point inside said first pipe section and said second pipe section at end of said pin tapered section of said pin.

e. a clamp equal in length to said pin calibrated section of said first pipe section and said second pipe section, elongated against inside wall of said liner by a hydraulically driven expansion means, securing said liner to said pin calibrated section of said first pipe section and said second pipe section and positioned inside said pin with a start point and an end point exactly matching a start point and an end point of said pin calibrated section, and f. an inside wall of said clamp positioned to create a continuous and substantially flush surface with said inside wall of said liner as it extends along inside wall of said first pipe section and said second pipe section outside of the area occupied by said pin.

6. The clamp of claim 5 wherein said clamp is comprised of:

a. a tubular member of predetermined dimensions preformed from metal by a metalmaking means with elongation properties adequate for the a 3% to 6% expansion of said clamp by said hydraulically driven expansion means.

b. a plurality of pin clamp risers of equal dimensions, said pin clamp risers having a roughly finished level surface area of a predetermined width, formed on an outside wall surface of said clamp by a clamp machining means, and c. a plurality of pin clamp cavities of equal dimensions, said pin clamp cavities having a substantially smooth finished surface area of a predetermined width, substantially parallel to and extending a predetermined depth below said pin clamp risers, formed on said outside wall surface of said clamp by said clamp machining means.

* * * * *